(12) United States Patent
Rose et al.

(10) Patent No.: US 8,718,626 B2
(45) Date of Patent: May 6, 2014

(54) COMMUNICATION SYSTEM UTILIZING NEAR FIELD COMMUNICATION (NFC) TO PROVIDE ENHANCED TELECONFERENCE FEATURES AND RELATED METHODS

(75) Inventors: Scott Douglas Rose, Waterloo (CA);
Jason Tyler Griffin, Kitchener (CA);
Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 173 days.

(21) Appl. No.: 13/179,800

(22) Filed: Jul. 11, 2011

(65) Prior Publication Data
US 2013/0017780 A1 Jan. 17, 2013

(51) Int. Cl.
*H04B 7/00* (2006.01)
(52) U.S. Cl.
USPC ........... 455/416; 455/518; 455/519; 455/410; 348/14.02
(58) Field of Classification Search
USPC .................. 455/416, 518, 519, 410, 41.2; 348/14.02; 370/260
See application file for complete search history.

(56) References Cited

U.S. PATENT DOCUMENTS

| | | | | |
|---|---|---|---|---|
| 6,763,226 B1* | 7/2004 | McZeal, Jr. | ............ | 455/90.2 |
| 7,228,145 B2* | 6/2007 | Burritt et al. | ............ | 455/519 |
| 7,236,773 B2* | 6/2007 | Thomas | ............ | 455/416 |
| 7,305,078 B2* | 12/2007 | Kardos | ............ | 379/202.01 |
| 7,363,045 B2* | 4/2008 | Rogalski et al. | ............ | 455/465 |
| 7,751,347 B2* | 7/2010 | Giroti | ............ | 370/260 |
| 7,801,486 B2 | 9/2010 | Barnier | ............ | 455/41.2 |
| 7,865,565 B2 | 1/2011 | Willey | ............ | 709/206 |
| 8,056,802 B2* | 11/2011 | Gressel et al. | ............ | 235/382 |
| 8,261,979 B2* | 9/2012 | Gressel et al. | ............ | 235/382.5 |
| 8,333,321 B2* | 12/2012 | Gressel et al. | ............ | 235/382 |
| 8,346,672 B1* | 1/2013 | Weiner et al. | ............ | 705/75 |
| 2006/0101116 A1* | 5/2006 | Rittman et al. | ............ | 709/204 |
| 2006/0215585 A1* | 9/2006 | Taniwaki | ............ | 370/260 |
| 2008/0207124 A1 | 8/2008 | Raisanen et al. | ............ | 455/41.2 |
| 2009/0075591 A1* | 3/2009 | Murdoch et al. | ............ | 455/41.1 |

(Continued)

FOREIGN PATENT DOCUMENTS

GB 2452020 2/2009
WO WO2006/085269 8/2006

OTHER PUBLICATIONS

Anonymous, "Near Field Communication White Paper", Internet Citation, Feb. 4, 2004, retrieved from the internet: http://www.ecma-international.org/activities/Communications/2004tg19-001.pdf, [retrieved on Mar. 6, 2006].
U.S. Appl. No. 11/859,614, filed Sep. 21, 2007.

(Continued)

*Primary Examiner* — Minh D Dao
(74) *Attorney, Agent, or Firm* — Allen, Dyer, Doppelt, Milbrath & Gilchrist, P.A.

(57) ABSTRACT

A communication system may include a plurality of conferencing endpoints at different locations and capable of being coupled to a telecommunication network, a respective near field communication (NFC) device associated with each conferencing endpoint, and a plurality of electronic devices. Each electronic device may be configured to register at one of the conferencing endpoints for a teleconference between the plurality of conferencing endpoints based upon communication with a respective NFC device associated with the one of the conferencing endpoints. At least one of the electronic devices may be further configured to provide a notification based upon a security level associated with another electronic device being registered for the teleconference.

18 Claims, 6 Drawing Sheets

(56) References Cited

U.S. PATENT DOCUMENTS

| | | |
|---|---|---|
| 2009/0082043 A1 | 3/2009 | Lazaridis .................... 455/466 |
| 2009/0157799 A1* | 6/2009 | Sukumaran et al. .......... 709/203 |
| 2009/0262914 A1 | 10/2009 | Khouri et al. ............ 379/202.01 |
| 2009/0325491 A1 | 12/2009 | Bell et al. .................... 455/41.3 |
| 2010/0138754 A1 | 6/2010 | Wilson ........................ 715/752 |
| 2010/0220845 A1 | 9/2010 | Oliver et al. ............. 379/202.01 |
| 2011/0045854 A1 | 2/2011 | Lazaridis .................... 455/566 |
| 2011/0078266 A1 | 3/2011 | Willey ........................ 709/206 |
| 2011/0153408 A1* | 6/2011 | Foust et al. ................ 705/14.36 |
| 2011/0279631 A1* | 11/2011 | Ranganath et al. ........ 348/14.08 |
| 2012/0019365 A1* | 1/2012 | Tuikka et al. ................ 340/10.1 |
| 2012/0022902 A1* | 1/2012 | Gressel et al. .................... 705/5 |
| 2012/0290643 A1* | 11/2012 | Fok Ah Chuen et al. ..... 709/203 |
| 2012/0311090 A1* | 12/2012 | Locker et al. ................ 709/218 |
| 2013/0017780 A1* | 1/2013 | Rose et al. ................... 455/41.1 |

OTHER PUBLICATIONS

U.S. Appl. No. 12/621,166, filed Nov. 18, 2009.

U.S. Appl. No. 12/917,123, filed Nov. 1, 2010.

U.S. Appl. No. 12/957,634.

* cited by examiner

COMMUNICATION SYSTEM UTILIZING NEAR FIELD COMMUNICATION (NFC) TO PROVIDE ENHANCED TELECONFERENCE FEATURES AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communication system is disclosed herein which may include a plurality of conferencing endpoints at different locations and capable of being coupled to a telecommunication network, a respective near field communication (NFC) device associated with each conferencing endpoint, and a plurality of electronic devices. Each electronic device may be configured to register at one of the conferencing endpoints for a teleconference between the plurality of conferencing endpoints based upon communication with a respective NFC device associated with the one of the conferencing endpoints. At least one of the electronic devices may be further configured to provide a notification based upon a security level associated with another electronic device being registered for the teleconference. Accordingly, the system may thereby provide enhanced security for teleconferences, for example.

More particularly, the system may further comprise a teleconference server configured to receive registration information for the electronic devices and determine respective security levels from the received registration information. The teleconference server may be further configured to identify each conference participant based upon the registration information for the plurality of electronic devices. Moreover, the at least one electronic device may be further configured to update a stored calendar event associated with the teleconference based upon the identified conference participants. Also, at least one of the conferencing endpoints may be configured to communicate registration information to the teleconference server. Furthermore, the at least one electronic device may be configured to communicate registration information to the teleconference server.

The security level may be determined based upon a telephone number associated with the other electronic device, an electronic mail address associated with the other electronic device, etc. At least one of the conferencing endpoints may be configured to announce electronic device registration for the teleconference. Furthermore, the at least one electronic device may comprise a mobile wireless communications device. The at least one electronic device may further comprise a display configured to display a visual alert based upon the security level associated with the other electronic device. Also, the system may further comprise a display coupled with at least one of the conferencing endpoints and configured to display a video feed received by the at least one conferencing endpoint during the teleconference.

A related electronic device is also provided and may be for use with a conferencing endpoint capable of being coupled to a telecommunication network and having a first NFC device associated therewith. The electronic device may include a second NFC device, and a controller coupled with the second NFC device. The controller may be configured to register at the conferencing endpoint for a teleconference based upon communication between the second NFC device and the first NFC device, and provide a notification based upon a security level associated with another electronic device being registered for the teleconference.

A related communication method may comprise registering a plurality of electronic devices at respective conferencing endpoints for a teleconference between the plurality of conferencing endpoints based upon communication between each electronic device and a respective NFC device associated with each of the conferencing endpoints. The method may also comprise providing a notification at least one of the electronic devices based upon a security access level associated with another electronic device being registered for the teleconference.

Referring initially to FIGS. 1 through 4, an example communication system 30 and related method aspects are first described. The system 30 may advantageously provide enhanced security features for teleconferences. Generally speaking, a "teleconference" comprises an exchange of information (typically including live communications) among several persons or devices remote from one another but linked by a telecommunications system or network. A teleconference may comprise or otherwise be referred to as an audio conference, telephone conference, phone conference, video conference, teleseminar, etc. The data or information exchanged during a teleconference may include one or more of audio, video, or data services via telephone, computer, telegraph, teletype, radio, television, etc. The data services may include sharing of documents, presentations, etc.

Corporate or industrial espionage is a serious concern for many companies and other organizations (e.g., government, etc.). With respect to teleconferences, unauthorized parties may attempt to call into a teleconference (e.g., via a call bridge, etc.) and eavesdrop on confidential communications. This may lead to a leak of highly sensitive information. Another potential security problem is being on a teleconference wherein external visitors (e.g., individuals not directly employed by the company or organization) are invited to participate, meaning there may be trusted as well as potentially untrusted participants on the teleconference. However, not all of the participants may be aware that such external or untrusted participants are on the call, and may therefore reveal sensitive information that the untrusted participant should not be privy to. Beyond security concerns, user convenience may also be a factor with teleconferences, as dialing into teleconference bridges usually requires the use of long and possibly unfamiliar phone numbers, extensions, passcodes, etc. It is time consuming to look up the phone numbers, extensions, and passcodes and to manually enter the numbers. Manual entry of phone numbers, extensions, and passcodes is subject to human error, and errors in the manual entry can add further delay and inconvenience.

The system 30 advantageously incorporates near field communication (NFC) features to help address the above-noted problems associated with teleconferences. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 1:
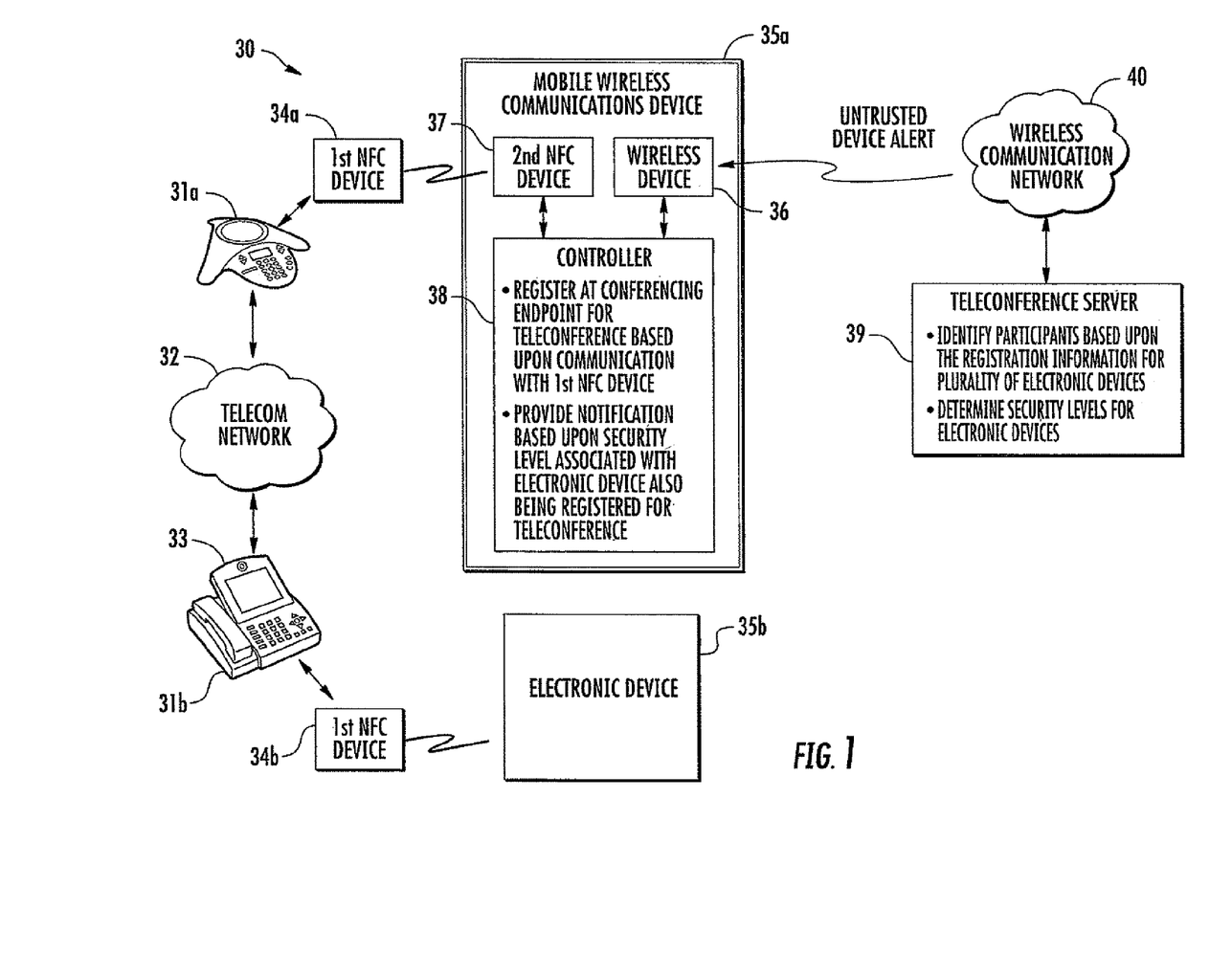
FIG. 1 is a schematic block diagram of a communication system in accordance with one example embodiment.

The system 30 illustratively includes a plurality of conferencing endpoints or teleconference terminals 31a, 31b at different locations (e.g., different geographic locations, different buildings, different portions of a large conference table in a meeting room, etc.) and coupled to a telecommunication network 32. In the illustrated example, the endpoint 31a comprises an audio conferencing endpoint (e.g., a speaker phone), and the endpoint 31b comprises a video conferencing endpoint (e.g., a video phone, which may also have speaker phone capabilities) with a video display 33 coupled thereto. The video display 33 may advantageously be configured to display a video feed received by the conferencing endpoint 31b during the teleconference, in some example embodiments. However, telephones without speaker phone or video capabilities, as well as mobile phones, may also be used as conferencing endpoints in some embodiments, for example.

Moreover, it should be noted that in some embodiments other devices may be used as conferencing endpoints, such as computers. For example, many computers (e.g., desktop computers, laptops, tablets, etc.) include microphones and speakers to provide audio communication capabilities, as well as Web cams to provide video communication capabilities over a telecommunication network. Example telecommunication networks may include wired telephone networks (e.g., plain old telephone service (POTS)), wireless networks (e.g., cellular), IP networks such as the Internet or other packet-switched networks (e.g., Voice over Internet Protocol (VoIP)), etc. It should also be noted that while only two conferencing endpoints 31a, 31b are shown in the illustrated example of FIG. 1, other numbers of conferencing endpoints may be used in different embodiments.

The system 30 further illustratively includes a respective first NFC device 34a, 34b associated with each conferencing endpoint 31a, 31b. In some embodiments, the NFC device 34a or 34b (e.g., an NFC transceiver) may be included within a same housing with the components of the respective conferencing endpoint 31a or 31b, and may be coupled to a control circuitry (e.g., processor, memory, network interface, etc.) for the respective conferencing endpoint. In another configuration, the NFC device 34a or 34b may be a stand-alone device positioned on or adjacent the respective conferencing endpoint 31a or 31b, for example. That is, a given first NFC device 34a or 34b may communicate with its respective conferencing endpoints 31a or 31b in some embodiments, but this need not be the case in all embodiments, as will be discussed further below. In some example embodiments, a given first NFC device 34a or 34b may be positioned outside a conference room in which the respective conferencing endpoints 31a or 31b is located, and may thereby serve as a security access point for entry into the conference room, if desired.

The system 30 also illustratively includes a plurality of electronic devices 35a, 35b. In the present example, the electronic device 35a comprises a mobile wireless communication device, which will also be referred to as a "mobile device" herein. Example mobile devices may include portable or personal media players (e.g., music or MP3 players, video players, etc.), portable gaming devices, portable or mobile telephones, smartphones, tablet computers, electronic readers ("e-readers"), etc., although other suitable types of mobile devices may also be used in various embodiments. In addition to mobile devices, other types of electronic devices that may be used with the system 30 generally include devices which are configured for NFC communication. For example, this may include NFC-enabled key cards or security badges, as well as other NFC tokens or devices.

The mobile device 35a illustratively includes a wireless device 36, which may comprise a wireless receiver, transmitter, or both, which may be combined as a transceiver. The mobile device 35a illustratively further includes a second NFC device 37, and a controller 38 coupled to the wireless device 36 and the second NFC device 37. The controller 38 may be implemented using a combination of hardware (e.g., processor, memory, etc.) and software (e.g., a computer-readable medium having computer-executable instructions), for example, to perform the various operations or functions described herein.

Figure 4:
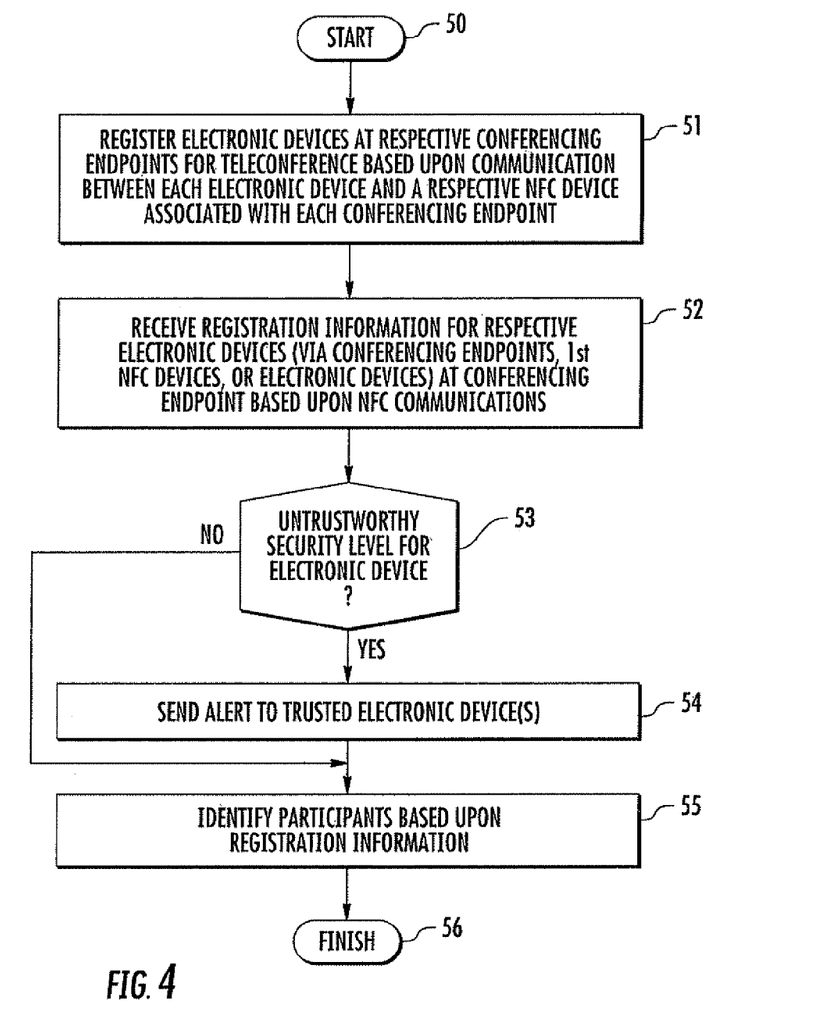
FIG. 4 is a flowchart illustrating method aspects associated with the system of FIG. 1.

Beginning at Block 50, each of the devices 35a, 35b is configured to register at a respective conferencing endpoint 31a, 31b for a teleconference between the plurality of conferencing endpoints, at Block 51. In particular, the registration occurs based upon communication with a respective first NFC device 34a, 34b associated with the given conferencing endpoint 31a, 31b. By way of example, the registration information may be communicated to a teleconference server 39. The teleconference server 39 may be used to provide a call bridge for the teleconference, and provide call management services such as connecting parties into the teleconference upon dialing in. By way of example, the registration information may comprise an access code for the teleconference, a personal identification number (PIN), a meeting invitation (e.g., an email invitation) for the teleconference, etc. In some example embodiments, security may be put in place to limit or restrict access to the teleconference (e.g., preventing logging in or connecting to the teleconference) if proper registration information is not provided.

The registration information may be communicated to the teleconference server 39 in different ways. One approach is that the conferencing endpoints 31a or 31b may communicate this information to the teleconference server 39, either by the telecommunication network 32, or a separate network connection (e.g., local area network (LAN), etc.), at Block 52. In some embodiments, the first NFC devices 34a, 34b may be connected to the telecommunication network 32 or other network, and thereby communicate the registration information to the teleconference server 39. In still another example embodiment, the mobile device 35a may communicate its respective registration information to the teleconference server 39 via the wireless device 36 and a wireless communications network 40 (e.g., cellular, Bluetooth, WiFi, WiMAX, etc.) for example. This may be particularly appropriate where the first NFC device 34a is a stand-alone device not otherwise in signal communication with its respective conferencing endpoint 31a, and also not connected to a communications network. However, various approaches for communicating registration information may be used for different electronic devices 35a, 35b within the system 30.

In the example shown in FIG. 1, the mobile device 35a has a respective security level associated therewith making it a trusted device, while the electronic device 35b has a respective security level associated therewith making it an untrusted device. So, as noted above, this may mean that the mobile device 35a is associated with a corporate employee or member of a given enterprise, corporation or organization, while the electronic device 35b is associated with someone from outside the enterprise, corporation or organization. In other embodiments, an untrusted participant may be from a same corporation or organization, yet not have a same level of security clearance as other participants from the corporation, for example. By way of example, this determination may be made based upon whether a name, telephone number, email address, etc. of a participant is listed in a corporate enterprise directory. Another approach is to determine whether a phone number or email address associated with a teleconference participant matches with a corresponding corporate phone number prefix or domain name, for example. Other suitable approaches for determining whether an electronic device 35a, 35b has a trustworthy security level associated therewith may also be used.

Accordingly, when a determination is made that one or more untrusted electronic devices are registered for the teleconference, at Block 53, the controller 38 may advantageously be configured to provide a notification to this effect. In some example embodiments, the teleconference server 39 may determine registration of an untrusted electronic device (s), and send an alert to the trusted electronic device(s) registered for the teleconference, at Block 54. For example, the alert may be forwarded to the mobile device 35a via the wireless communications network 40. However, it should be noted that in some example embodiments the mobile device 35a may make its own determination as to whether other electronic devices on the teleconference are trusted or not (e.g., through comparison to a contacts list, etc.).

Figure 2:
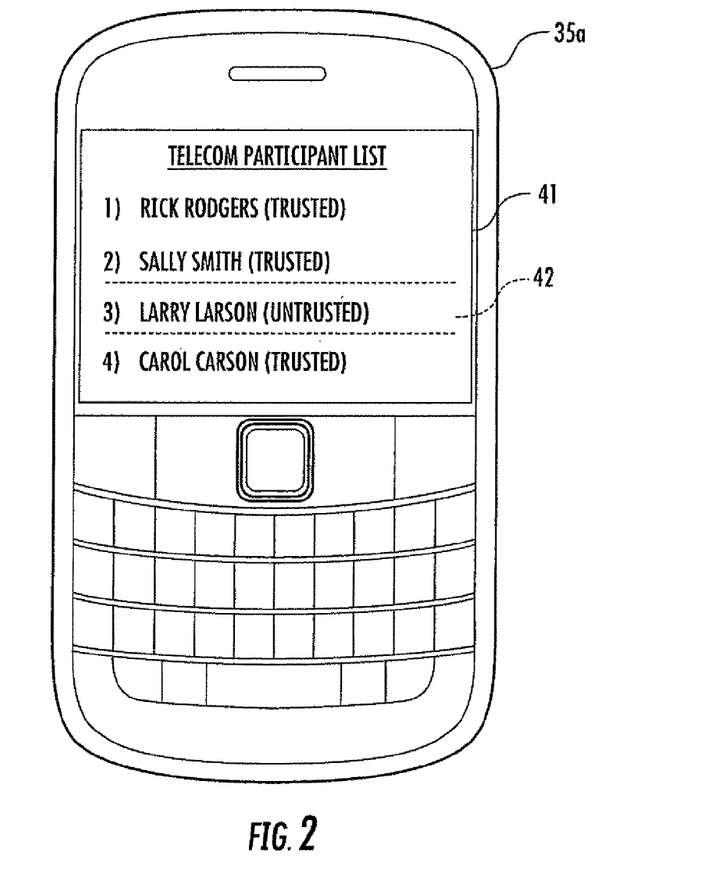
FIG. 2 is a front view of an example embodiment of a mobile wireless communications device displaying participant information for a teleconference implemented with the system of FIG. 1.

In the example of FIG. 2, the mobile device 35a further illustratively includes a display 41. A participant list including the participants or attendees of the teleconference may advantageously be generated, at Block 55, and displayed on the display 41, which illustratively concludes the method of FIG. 4 (Block 56). The participant list may be generated by the teleconference server 39 and forwarded to the mobile device 35a, such as through an email or SMS message, calendar reconciliation (e.g., through a Microsoft® Exchange server), etc. In some embodiments, the controller 38 may generate the list based upon participant information it receives via the teleconference server 39, or through conferencing endpoint 31a via the first NFC device 34a.

In the present example, the participant list includes four participants, namely Rick Rodgers, Sally Smith, Larry Larson, and Carol Carson. A meeting invitation may have been sent to the participants via e-mail, e.g., to Rick Rodgers (rrodgers@internalcompany.com), Sally Smith (ssmith@internalcompany.com), Larry Larson (llarson@externalcompany.com), and Carol Carson (ccarson@internalcompany.com). Of these, all but Larry Larson have been determined to be trusted participants on the teleconference. Not only is the status of the participant listed after his or her respective name, but a visual alert indicator 42 (here a dashed box) is also provided to help highlight the fact that an untrusted participant (i.e., Larry Larson) is on the teleconference, and therefore warn the remaining trusted participants that they may need to refrain from speaking about sensitive or secure matters during the teleconference. Other visual alerts may also be used, such as highlighting or change of colors, bold text, flashing text, icons or symbols, etc.

It should be noted that the participant list may be updated during the teleconference as participants join or leave. In addition, the participant list may indicate the time that each participant joined the teleconference and the time that each participant left the teleconference. The participant list may also indicate a length of time that each participant was in attendance on the teleconference. Moreover, the participant list may be different for different electronic devices. For example, the teleconference server 39 may provide a list to the untrusted electronic device 35b that does not identify who is trusted or untrusted. Other information may also be included with the participant list, such as pictures associated with the participants, location, company or organization affiliations, position or job title, etc. Additionally, in some example embodiments the conferencing endpoints 31a, 31b may display participant information. Moreover, in some example embodiments the conferencing endpoints 31a, 31b may announce registration of electronic devices (e.g., by providing the names of participants associated with the respective electronic device via audio over a speaker or visually on a display or both) for the teleconference. The name of each participant may be provided as each participant joins the teleconference and as each participant leaves the teleconference.

Figure 3:
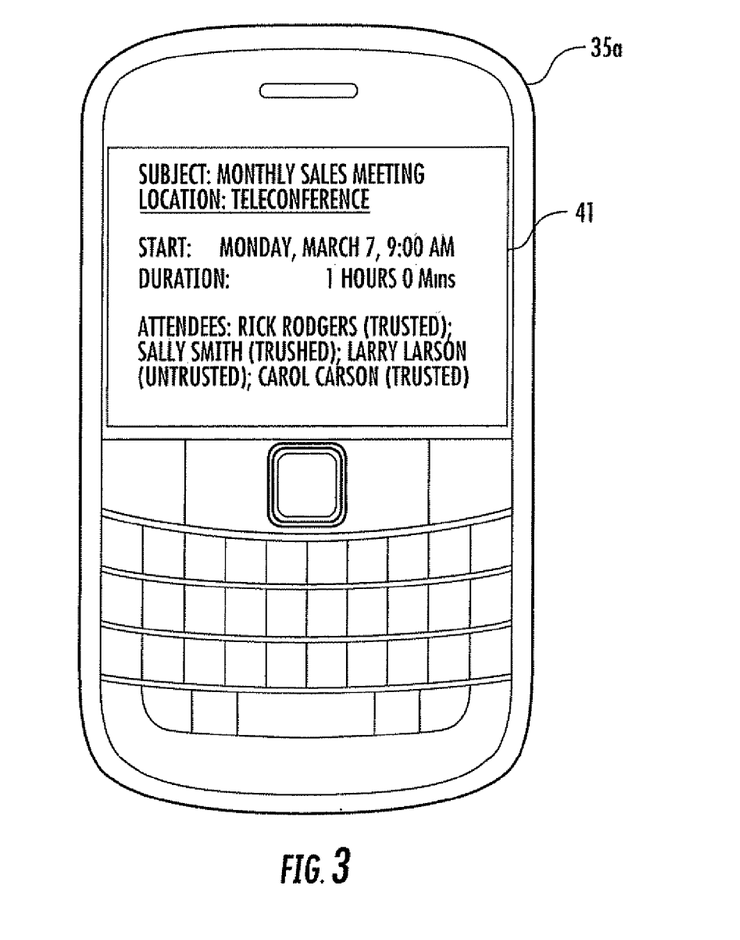
FIG. 3 is a front view of the mobile wireless communications device of FIG. 2 displaying a calendar entry with participant data for the teleconference.

In some example embodiments, the controller 38 may be further configured to incorporate the participant list into a stored calendar event associated with the teleconference, as shown in FIG. 3. In this example, the calendar event for the teleconference with the participants noted above (the "attendees") is shown on the display 41, along with the subject of the meeting ("monthly sales meeting"), the location ("teleconference"), start time ("Monday, March 7, 9:00 AM"), and the duration ("1 Hours, 0 Mins"). Here again, the calendar event may be synchronized via a Microsoft® Exchange server, etc., and other information regarding the meeting (e.g., end time, comments, etc.) may optionally be stored with the calendar event displayed on the display 41.

Figure 5:
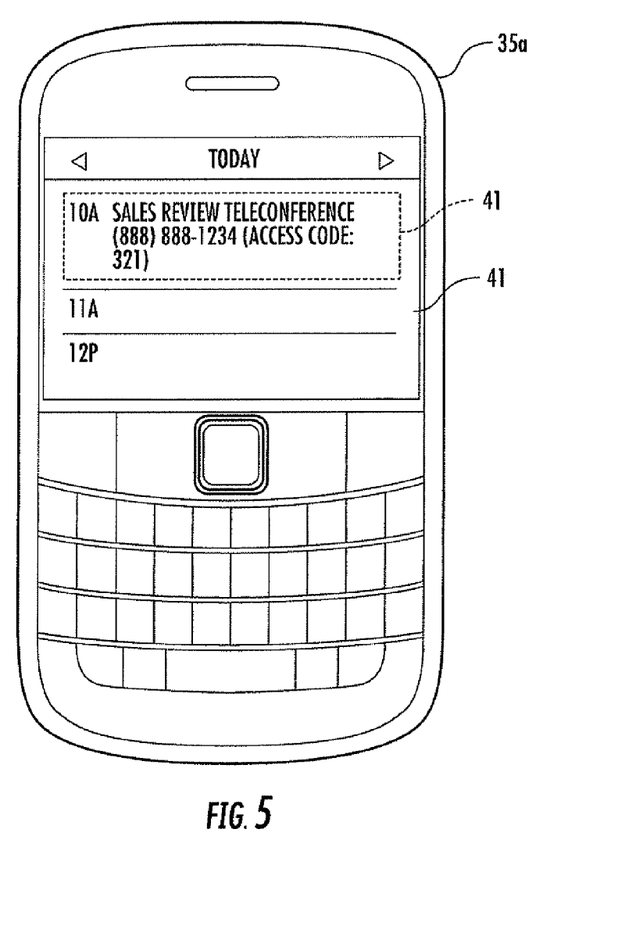
FIG. 5 is a front view of the mobile wireless communications device of FIG. 2 displaying a calendar entry for selection to initiate connection to a teleconference.

The foregoing will be further understood with reference to an example use case. For a given teleconference, instead of dialing phone numbers at conferencing endpoints 31a, 31b, participants swipe or bump their respective electronic devices 35a, 35b (e.g., with a meeting invitation or calendar entry open on the display 41) with the first NFC devices 34a, 34b. Referring additionally to the example of FIG. 5, the conferencing endpoint 31a may automatically dial a number provided by the mobile device 35a from the selected (as indicated by a dashed box 60) calendar entry or meeting invitation for the "sales review teleconference" scheduled from 10 AM to 11 AM. That is, the conferencing endpoint 31a may obtain the dial-in number, access code, etc., through NFC communication with the mobile device 35a, and use this information to connect to the teleconference accordingly. In some embodiments, however, such information may be obtained from the teleconference server 39 or other database, responsive to NFC communication with the mobile device 35a (e.g., the mobile device provides a meeting ID, which the conferencing endpoint 31a uses to look up the appropriate teleconference access information).

In some example embodiments, a participant may use certain types of electronic devices (e.g., mobile devices) to log in or sign in to the teleconference (such as through providing a password or PIN) to verify that they are trusted. Moreover, participants may be prevented from logging in to the teleconference without proper credentials, or if they do not have a proper invitation, to advantageously provide enhanced security, as noted above. If all of the participants on the list of invitees are known to be trusted, this also helps ensure that other untrusted participants will not be participating in the teleconference, i.e., by keeping untrusted participants from dialing into the teleconference in the first place.

Upon registration for the teleconference via NFC, the participant's name, company, etc., may be automatically broadcasted or announced to indicate that the participant has joined the call. In some example embodiments, accommodation for participants who may be traveling (e.g., they may be in a hotel, airport, car, etc.) or are working from home and do not have access to an NFC conference endpoint or NFC tagged teleconference terminal may be provided. For example, to allow such participants on the teleconference, other security credentials may be used (e.g., security badge number, employee number, password, etc.).

The system 30 may therefore provide several technical advantages. For example, dialing into a conference bridge, etc., may be automated for participant convenience, so that the participant does not have to look up and type in phone numbers, access codes, etc. Not only may this be quicker and more convenient for users, it may also be more accurate. Moreover, the system 30 may also advantageously allow participants to know how many people are on the line, as well as who those people are, at a given time. Furthermore, participants who enter the teleconference or drop off may be tracked. As noted above, if an external (i.e., untrusted) participant logs into the meeting (e.g., a person outside of the corporation or organization), an indicator, prompt or warning may advantageously be provided to serve as a warning or notification for other participants that someone outside the organization is present on the teleconference. The system 30 may also advantageously help prevent unauthorized access to the teleconference, as noted above.

It should also be noted that the system 30 is applicable to in-person meetings and a combination of in-person meetings and teleconferences. That is, meeting participants in a same room may be asked or required to sign in to the meeting using respective mobile devices 35, 35b. In instances where multiple participants are in a same meeting room during a teleconference and all sign in with their respective mobile devices 35a, 35b via a given NFC device 34a, 34b, various approaches may be used for connecting to the conference call. For example, checking in by the first participant (i.e., through swiping of his mobile device 35a or 35b with an NFC device 34a or 34b in the conference room) may cause a respective conferencing endpoint 31a or 31b to initiate or connect to the teleconference, as described above. In another example approach, the teleconference may be initiated upon checking in a participant designated as a host or leader for the teleconference. Another example approach is that the teleconference may be initiated based upon all participants registered for the given location having checked in. Yet another example is that the teleconference will be initiated at the scheduled starting time so long as one (or more) participants have already checked in.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
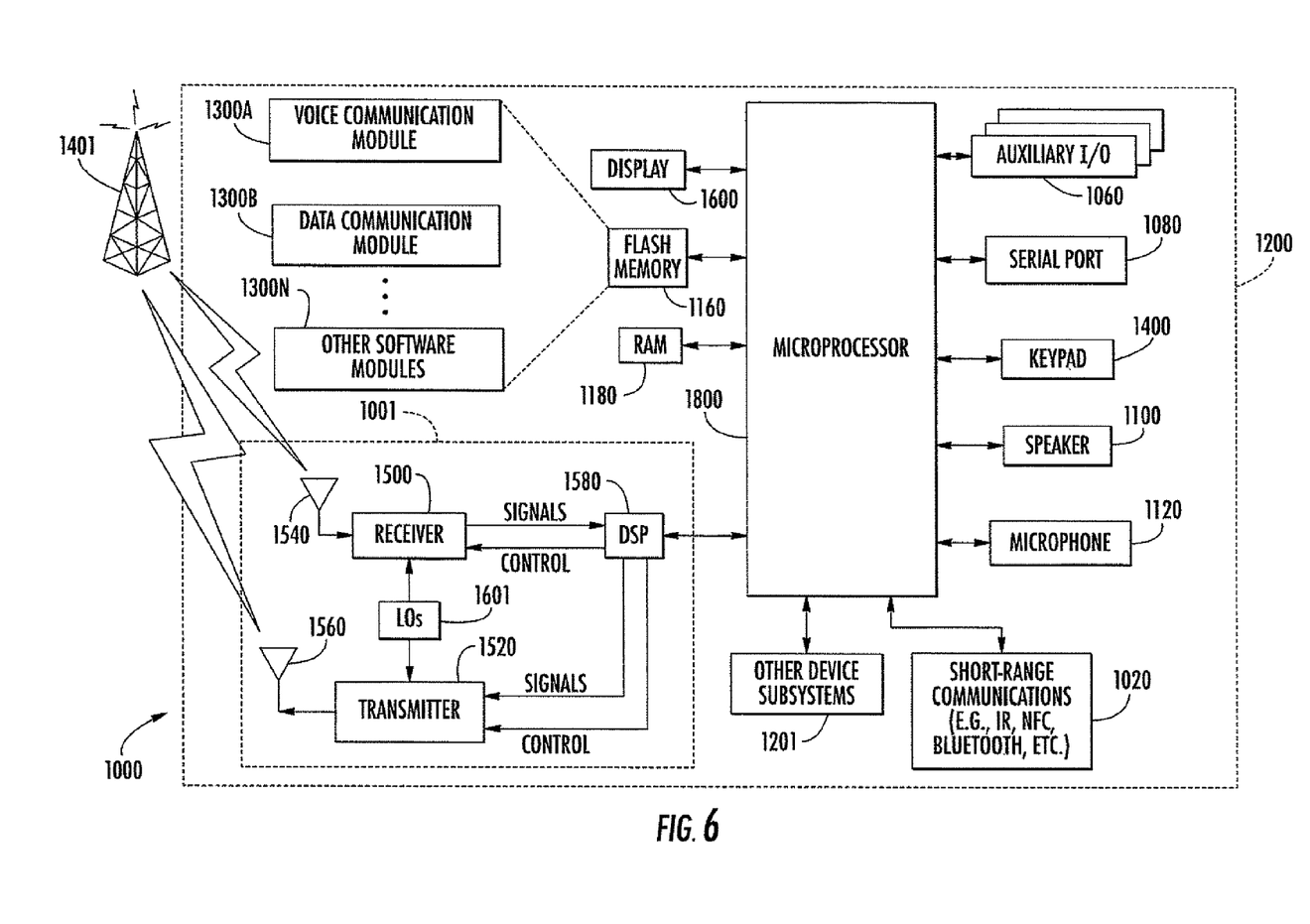
FIG. 6 is a schematic block diagram illustrating example components of a mobile wireless communications device that may be used with the devices of FIG. 1-3 or 5.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A teleconference server for use with a conferencing endpoint capable of being coupled to a telecommunication network and having a first near field communication (NFC) device associated therewith, the server configured to:
   establish a teleconference between a plurality of conferencing endpoints;
   receive registration information regarding a plurality of electronic devices each configured to register at one of the plurality of conferencing endpoints based upon communication with a respective NFC device associated with said one of the conferencing endpoints;
   identify each conference participant based on the received registration information;
   determine respective security levels from the received registration information; and
   send participant information to at least one of the plurality of electronic devices.

2. The teleconference server of claim 1 further configured to send information regarding participants whose security level is below a threshold to electronic devices of participants whose security level is at or above the threshold.

3. The teleconference server of claim 2 wherein said at least one of the plurality of electronic devices is further configured to update a stored calendar event associated with the teleconference based upon the identified conference participants.

4. The teleconference server of claim 2 wherein the electronic devices of participants whose security level is at or above the threshold further comprises a display configured to display a visual alert based upon the security level associated with the participants whose security level is below the threshold.

5. The teleconference server of claim 1 wherein at least one of said conferencing endpoints is configured to communicate registration information to said teleconference server.

6. The teleconference server of claim 1 wherein the plurality of electronic devices is configured to communicate registration information to said teleconference server.

7. The teleconference server of claim 1 wherein the security level is determined based upon a telephone number associated with a given electronic device.

8. The teleconference server of claim 1 wherein the security level is determined based upon an electronic mail address associated with a given electronic device.

9. The teleconference server of claim 1 wherein at least one of said conferencing endpoints is configured to announce electronic device registration for the teleconference.

10. The teleconference server of claim 1 wherein said at least one electronic device comprises a mobile wireless communications device.

11. The teleconference server of claim 1 wherein at least one of the conferencing endpoints comprises a display and is configured to display a video feed received by said at least one conferencing endpoint during the teleconference.

12. An electronic device for use with a conferencing endpoint capable of being coupled to a telecommunication network and having a first near field communication (NFC) device associated therewith, the electronic device comprising:
   a display;
   a second NFC device; and
   a controller coupled with said second NFC device, the controller being configured to
      register at the conferencing endpoint for a teleconference based upon communication between said second NFC device and the first NFC device,
      receive and display information regarding participants of the teleconference on the display, and
      cause said display to display a visual alert based upon a security level associated with at least one other electronic device registered for the teleconference.

13. The electronic device of claim 12 wherein said controller is further configured to update a stored calendar event associated with the teleconference based upon the received participant information.

14. The electronic device of claim 12 further comprising a transmitter coupled with said controller; and wherein said controller is further configured to communicate registration information via said transmitter.

15. The electronic device of claim 12 wherein the security level associated with at least one other electronic device registered for the teleconference is determined based upon at least one of a telephone number or an email address associated with the at least one other electronic device.

16. A method of operating a teleconference server comprising:
   establishing a teleconference between a plurality of conferencing endpoints capable of being coupled to a telecommunication network and having a first near field communication (NFC) device associated therewith;
   receiving registration information regarding a plurality of electronic devices each configured to register at one of the plurality of conferencing endpoints based upon communication with a respective NFC device associated with said one of the conferencing endpoints;
   determining respective security levels from the received registration information; and
   sending participant information to at least one of the plurality of electronic devices.

17. The method of claim 16 further comprising updating a stored calendar event of one of the electronic devices associated with the teleconference based upon identified conference participants.

18. The method of claim 16 further comprising receiving registration information from at least one of the electronic devices.

* * * * *